United States Patent
Nguyen et al.

(10) Patent No.: US 9,304,692 B2
(45) Date of Patent: *Apr. 5, 2016

(54) SOLID-STATE DRIVE COMMAND GROUPING

(71) Applicant: MARVELL WORLD TRADE LTD., St. Michael (BB)

(72) Inventors: Lau Nguyen, Sunnyvale, CA (US); Perry Neos, Los Altos, CA (US); Gwoyuh Hwu, Cupertino, CA (US)

(73) Assignee: MARVELL WORLD TRADE LTD. (BB)

(*) Notice: Subject to any disclaimer, the term of this patent is extended or adjusted under 35 U.S.C. 154(b) by 100 days.

This patent is subject to a terminal disclaimer.

(21) Appl. No.: 14/032,266

(22) Filed: Sep. 20, 2013

(65) Prior Publication Data

US 2014/0025873 A1    Jan. 23, 2014

Related U.S. Application Data (63) Continuation of application No. 12/694,501, filed on Jan. 27, 2010, now Pat. No. 8,543,756.

(60) Provisional application No. 61/149,161, filed on Feb. 2, 2009.

(51) Int. Cl.
    *G06F 12/00*      (2006.01)
    *G06F 3/06*      (2006.01)

(52) U.S. Cl.
    CPC ............ *G06F 3/0613* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,509,134 A | 4/1996 | Fandrich et al. | |
| 5,802,345 A * | 9/1998 | Matsunami et al. | ............ 703/27 |
| 7,318,118 B2 * | 1/2008 | Chu et al. | ........................ 711/103 |
| 7,505,298 B2 | 3/2009 | Yang et al. | |
| 2007/0008959 A1 | 1/2007 | Radulescu et al. | |
| 2008/0140999 A1 | 6/2008 | Gong | |
| 2008/0148131 A1 | 6/2008 | Hughes et al. | |
| 2008/0154928 A1 | 6/2008 | Bashyam et al. | |
| 2009/0049234 A1 * | 2/2009 | Oh et al. | ........................ 711/103 |
| 2009/0052260 A1 | 2/2009 | Kim et al. | |
| 2009/0144487 A1 | 6/2009 | Liu et al. | |
| 2009/0168567 A1 | 7/2009 | Kim et al. | |
| 2009/0265506 A1 * | 10/2009 | Yim | ........................ 711/103 |

FOREIGN PATENT DOCUMENTS

CA      2 672 035 A1      6/2008

* cited by examiner

*Primary Examiner* — Daniel Tsui (57) ABSTRACT

An apparatus and other embodiments associated with solid-state drive command grouping are described. In one embodiment, an apparatus includes a hardware memory configured to store a plurality of commands that are to be executed on a solid-state drive. The apparatus also includes organization logic implemented with at least hardware and configured to arrange at least two commands of the plurality of commands into a command pack based, at least in part, on one or more attributes of the at least two commands.

19 Claims, 11 Drawing Sheets

SOLID-STATE DRIVE COMMAND GROUPING

CROSS REFERENCE TO RELATED APPLICATIONS

This disclosure is a continuation of U.S. application Ser. No. 12/694,501 filed on Jan. 27, 2010, now U.S. Pat. No. 8,543,756 which claims benefit under 35 USC §119(e) to U.S. provisional application Ser. No. 61/149,161 filed on Feb. 2, 2009, which is hereby wholly incorporated by reference.

BACKGROUND

Information included in the background section is not admitted prior art. A solid-state drive is a memory device with solid-state memory. Solid-state memory includes few if any moving parts. With few or no moving parts, a solid-state drive is reliable.

Read and/or write commands may be executed on the solid-state drive. A command to be executed is evaluated before execution. This evaluation is used in determining a channel to be used in executing the command. The command is then executed using the selected channel. If a large number of commands are to be executed, then executing the commands may take a long time.

SUMMARY

In general, in one aspect this specification discloses a method. The method includes grouping at least two commands from a plurality of commands into a command pack based, at least in part, on one or more attributes of the at least two commands. The method also includes controlling a solid-state drive to execute the command pack by causing the at least two commands to execute concurrently on separate channels of the solid-state drive.

In general, in one aspect this specification discloses an apparatus. The apparatus includes a hardware memory configured to store a plurality of commands that are to be executed on a solid-state drive. The apparatus also includes organization logic implemented with at least hardware and configured to arrange at least two commands of the plurality of commands into a command pack based, at least in part, on one or more attributes of the at least two commands.

In general, in another aspect this specification discloses an apparatus. The apparatus includes management logic implemented in at least hardware and configured to collect a plurality of commands into a queue. The plurality of commands are data access commands for a solid-state drive. The apparatus also includes organization logic implemented in at least hardware and configured to link at least two commands from the plurality of commands together into a command pack based, at least in part, on one or more attributes of the at least two commands.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example apparatuses and other embodiments associated with solid-state device command grouping. The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory storage medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read. Computer-readable medium as described herein is limited to statutory subject matter under 35 U.S.C. §101.

"Logic", as used herein, includes hardware, firmware stored in a non-transitory memory, a non-transitory computer-readable medium with stored instructions, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics. Logic as described herein is limited to statutory subject matter under 35 U.S.C. §101.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. The methods described herein are limited to statutory subject matter under 35 U.S.C. §101.

Figure 1:
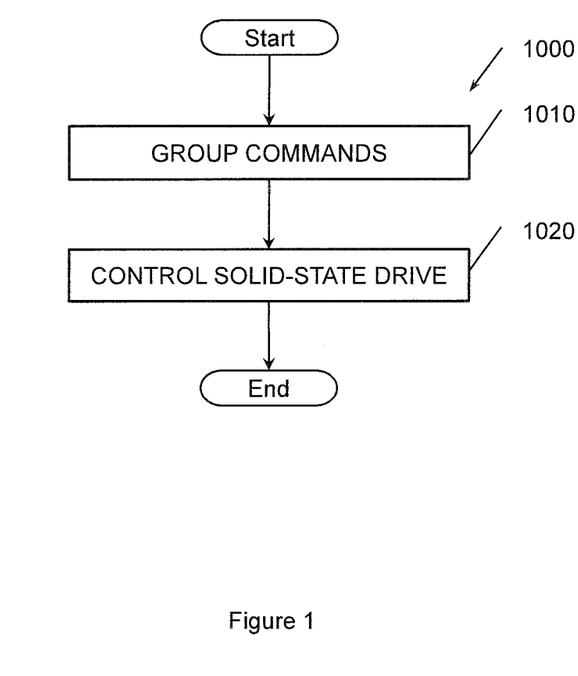
FIG. 1 illustrates one embodiment of a method for grouping commands and controlling how those grouped commands are executed on a solid-state drive.

FIG. 1 illustrates a method 1000. The method 1000 is related to grouping commands and controlling how those grouped commands are executed on a solid-state drive (SSD).

At 1010, method 1000 includes grouping a first command and a second command into a command pack. The first command and the second command do not share a common channel for execution. A command may be a read command or write command to be executed on a solid-state drive. Intelligently grouping commands can yield execution efficiencies.

At 1020, method 1000 includes controlling the SSD to execute the command pack on the SSD. Executing the command pack causes the first command and the second command to execute concurrently on separate channels. Since the first command and second command are executed concurrently on separate channels, the commands execute more efficiently than if executed independently.

In one embodiment, a command is grouped into the command pack based, at least in part, on a management scheme. The management scheme can be designed to, for example, minimize a number of command packs used to execute a command set. One example command set includes the first command and the second command. The command set is a group of commands waiting for execution on the SSD.

A command may or may not be grouped into a command pack based on the command's priority. For example, a first command with a high priority may not be grouped into a command pack while a second command with a low priority may be grouped into a command pack.

A command also may be grouped into a command pack based on the occurrence of a queue-related event. A queue is a separate storage location configured to store commands waiting to be executed. Conditions in the queue may change over time. These changing conditions may affect command grouping. These conditions include, but are not limited to, the queue reaching a threshold level, the queue surpassing the threshold level, and a command being resident in the queue for a predetermined threshold time. One skilled in the art will appreciated that the threshold level may be user-defined, hard coded, and others.

A command may be selectively grouped into the command pack upon determining that a command size does not exceed a command size threshold. If a command is relatively large, then enough channels are used and grouping does not occur. One skilled in the art will appreciated that the command size threshold may be user-defined, hard coded, and others.

Figure 2:
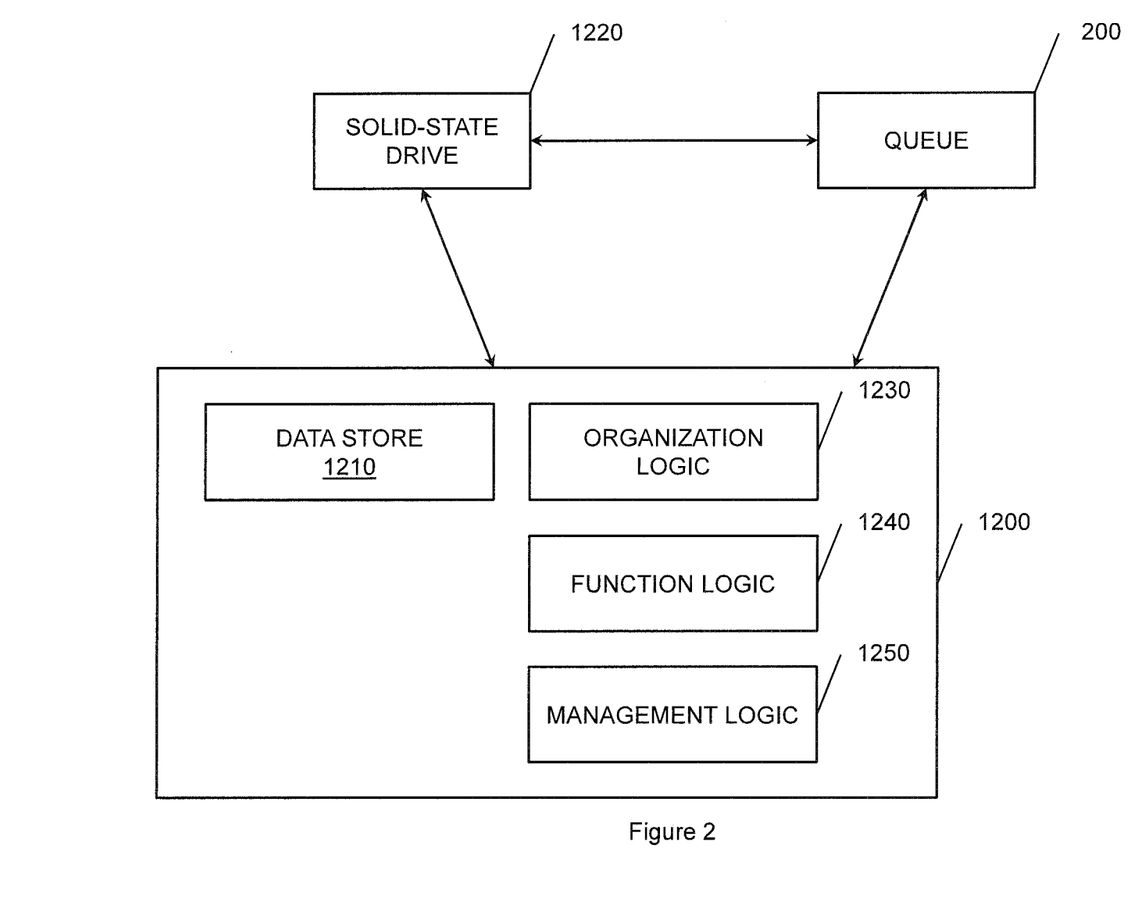
FIG. 2 illustrates one embodiment of an apparatus for grouping commands, creating relationships between commands, and controlling execution of those commands.

FIG. 2 illustrates an apparatus 1200. The apparatus 1200 groups commands and controls execution of those commands. The apparatus 1200 includes a data store 1210. The data store 1210 stores a first command and a second command. The first command and the second command are to be executed on a solid-state drive 1220. Executing a command on the solid-state drive 1220 consumes at least one channel. Consuming a channel includes giving the command exclusive access to the channel during execution of the command.

The apparatus 1200 also includes organization logic 1230. The organization logic 1230 arranges the first command and the second command into a command pack. Arrangement occurs upon determining that the first command and the second command do not share a common channel for execution. Since the commands do not share a common channel, the exclusive access is not violated. Since the exclusive access is not violated, the commands can be executed simultaneously.

The apparatus 1200 also includes a function logic 1240. The function logic 1240 controls the command pack to be executed on the solid-state drive 1220. The first command and the second command are to be executed simultaneously. The commands can be executed simultaneously because command pack commands are provided exclusive access to necessary channels and the necessary channels are not competing with each other because of how the commands were grouped together.

In one embodiment, the organization logic 1230 and function logic 1240 are embodied on an integrated circuit. The integrated circuit may be, for example, an ASIC, a field programmable gate array (FPGA), and others.

A device that sends commands to be executed on SSD 1220 may notify the apparatus 1200 that the command is a high priority command. The organization logic 1230 may be configured to not group the command into the command pack upon determining that the command is a high priority command. In this example, the organization logic 1230 causes the function logic 1240 to execute the command independent of the command pack (e.g. individually). The organization logic 1230 may also be configured to group a command into the command pack upon determining that the command is not a high priority command.

In one example, the data store 1210 is the queue 200 as discussed in connection with FIGS. 5-10. When the data store 1210 is the queue 200, the organization logic 1230 is configured to group the first command and the second command into the command pack upon identifying a queue-related event. In this example, the queue-related event is the queue reaching a threshold level, the queue surpassing the threshold level, and a command being resident in the queue for a predetermined threshold time. One skilled in the art will appreciate from this disclosure and from the teachings herein that the data store 1210 may implement other data structures (e.g., list, table). One skilled in the art will also appreciate that organization logic 1230 groups the commands upon identifying another data structure-related event.

In one example, the organization logic 1230 selectively groups a command into the command pack upon determining that a command size exceeds or reaches a threshold. The apparatus 1200 therefore intelligently groups commands to cause efficient execution of the commands on the solid-state drive 1220.

In one embodiment, the apparatus 1200 includes management logic 1250. The management logic 1250 creates a relationship (e.g., 700 of FIG. 9) between the first command and the second command. The relationship indicates that the first command and the second command are part of the command pack. Relationships can act as a guide to how the command pack is organized.

In one example, the management logic 1250 deletes a queue relationship between the first command and a third command. An example queue relationship that is deleted is a relationship between commands that use a common channel. The queue 200 is a separate storage location configured to store commands waiting to be executed.

In one embodiment, the organization logic 1230 groups a command into the command pack based, at least in part, on a management scheme. The management scheme minimizes a number of command packs used to execute a command set. The first command and the second command are command set members. The command set is a group of commands waiting for execution on the solid-state drive 1220.

In one example, the organization logic 1230 partially prepares the first command and the second command. Partial preparation is performed prior to arranging the first command and the second command into the command pack. For example, partial preparation may include selecting candidate commands that are to be packed together and executed. As will be described in more detail in the examples below, execution conditions and/or resource availability may change from the time of the partial preparation to the time of final packing. If certain conditions change, the candidate commands that are to be group may also change. Command preparation comprises adapting a command for execution on the channel. For example, adapting a command may include modifying one or more of the fields in the queue 500 associated with the command (e.g. changing the links to the next or last command thereby changing the order/grouping of commands). Arranging the first command and the second command into a command pack completes preparation. With preparation complete, commands are executed.

Figure 3:
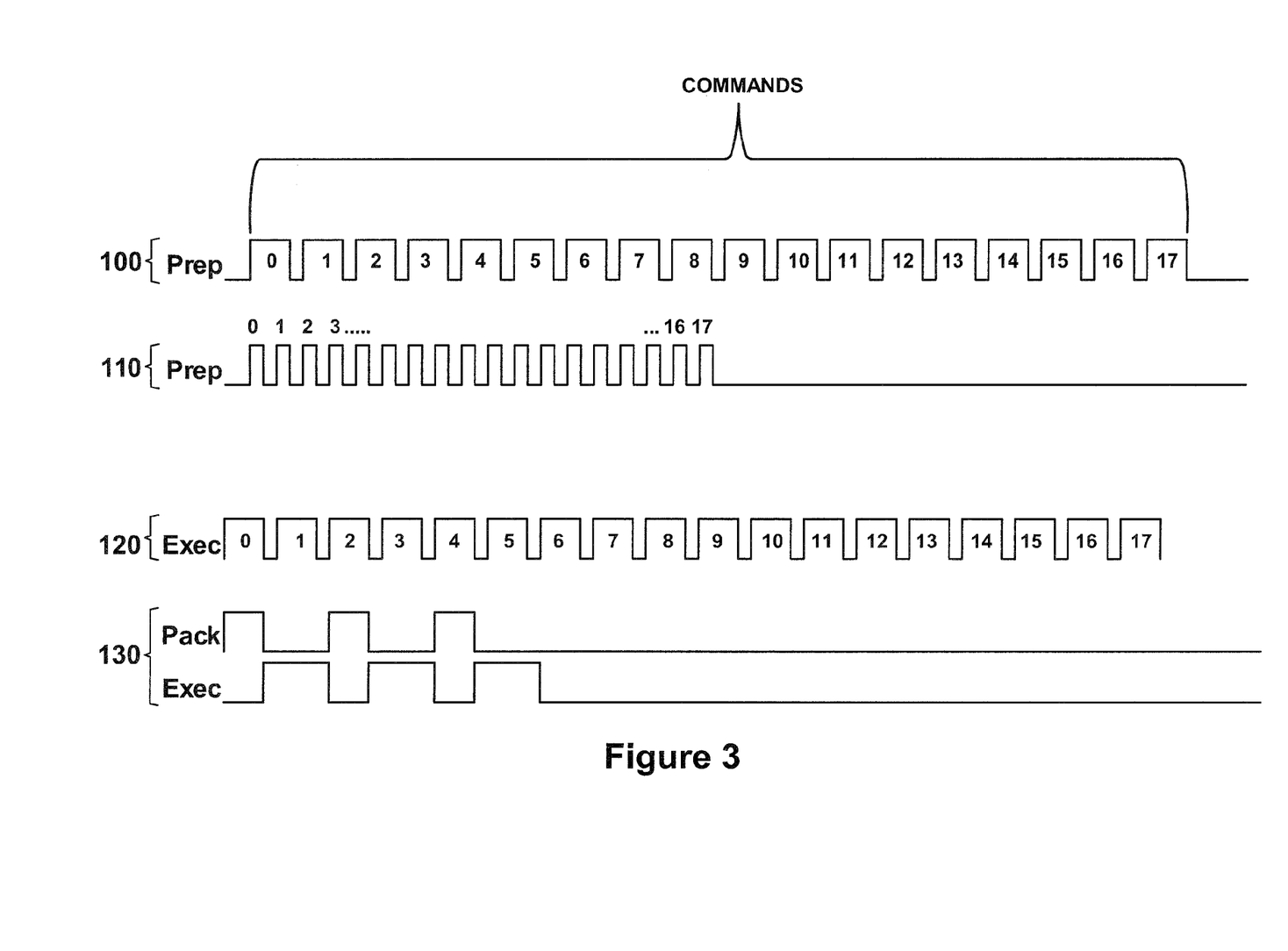
FIG. 3 illustrates one embodiment of timing diagrams for different command execution formats.

Turning now to FIG. 3, timing diagrams associated with read/write commands in a computer system are illustrated. FIGS. 4-11 illustrate commands that can be processed by method 1000 and/or apparatus 1200. In a computer system, a host device sends read and write commands to a memory. The memory may be, for example, an SSD. Commands are executed by the SSD to achieve a desired function. In one example, a write command is executed to write information to a memory location. While commands may be executed individually, it is more efficient to execute multiple commands together in a command pack. Therefore, commands are collected from the host device and retained in a queue until a designated event occurs. When the designated event occurs, the commands are intelligently grouped together into command packs. The command packs are then executed along channels, yielding improved performance.

The SSD includes channels. A channel is a communication medium. Channels are used to execute commands. In one example, an SSD can include sixteen channels. The number of channels used to execute a command is based, at least in part, on a command length. In one example, if the command is fourteen blocks long, then fourteen channels are used to execute the command. The remaining two channels sit idle.

While large commands use many channels, smaller commands use fewer channels. In one example, a command with a one-block length uses one channel. If the command is executed alone, then fifteen channels sit idle. Having fifteen channels sit idle is a tremendous resource waste. To help alleviate the resource waste, commands are executed together. Commands are intelligently grouped together so more commands are executed at one time.

FIG. 3 discloses timing diagrams for different command execution formats. Timing diagrams 100 and 110 illustrate command preparation. Timing diagram 100 illustrates timing associated with commands that are prepared individually and completely. Commands illustrated in 100 are not subjected to command packing. Without being subjected to command packing, a large amount of time is taken to prepare each command. Timing diagram 110 illustrates timing associated with commands that are prepared individually, but only partially. Partial preparation takes less time than complete preparation.

Timing diagrams 120 and 130 illustrate timing associated with command execution. Timing diagram 130 also illustrates timing associated with command packing. Timing diagram 130 is a continuation of timing diagram 110. With timing diagram 110, commands were partially prepared. As shown by timing diagram 130, commands are packed to complete preparation. Command packs are then executed. Timing diagram 120 illustrates timing associated with executing commands without command packing. Timing diagram 120 is a continuation of timing diagram 100. As can be seen, timing diagrams 110 and 130 illustrate taking less time being consumed than timing diagrams 100 and 120. For example in FIG. 3, timing diagrams 100 and 130 complete after command 17 is completed. This point in time occurs later than when the last command finishes in the timing diagrams of 110 and 130, which also represents command 17. Command 17 is not labeled in timing diagram 130 since it is packed and executed with a group of commands. Thus, using command packing makes command execution more efficient.

Figure 4:
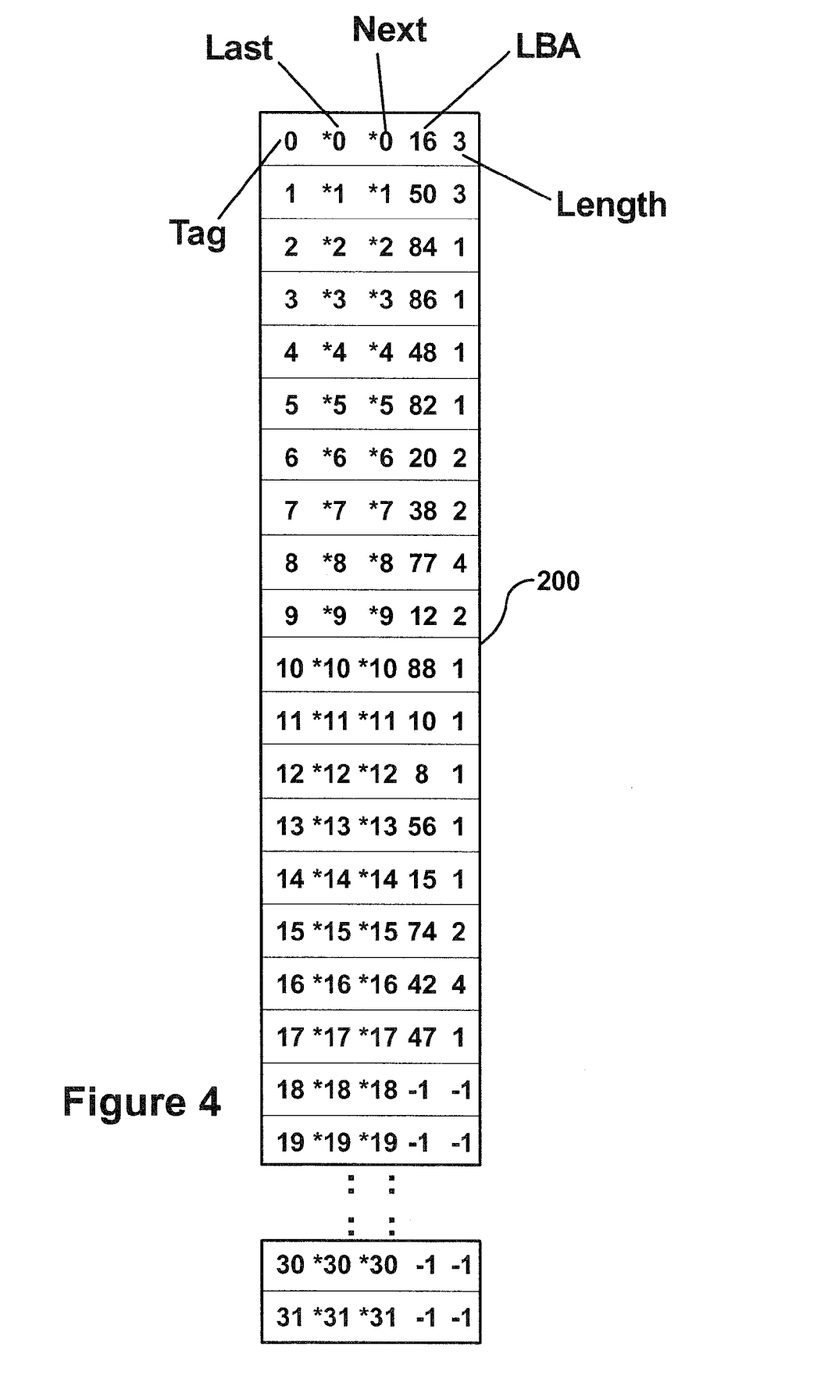
FIG. 4 illustrates one embodiment of a queue filled with commands for execution on a solid-state drive.

FIG. 4 illustrates a queue 200 filled with commands for execution on the SSD. Commands in the queue 200 have five fields. The fields are tag, last, next, logical block address (LBA) and length. The fields highlight information about the commands. In one example, the LBA discloses a first memory location for the command while last and next are pointers to other commands. The following is pseudo-code used to structure the command in the queue 200:

```
typedef struct uQCmdEntry {
    mUINT_32                count;
    struct uQCmdEntry *     pNext;
    struct uQCmdEntry *     pPrevious;
    mUINT_32                lba;
    mUINT_16                auDone;
    mUINT_8                 tagNum;
    union {
        mUINT_8 all;
        struct {
            mUINT_8 trkEnd     : 1;
            mUINT_8 opTypeWr : 1;
            mUINT_8 reserved   : 6;
        } bits;
    } uFlags;
} mtUQ_CMD_ENTRY
```

One of ordinary skill in the art will appreciate from this disclosure and from the teachings herein that other code may be used to structure the command in the queue 200.

Figure 5:
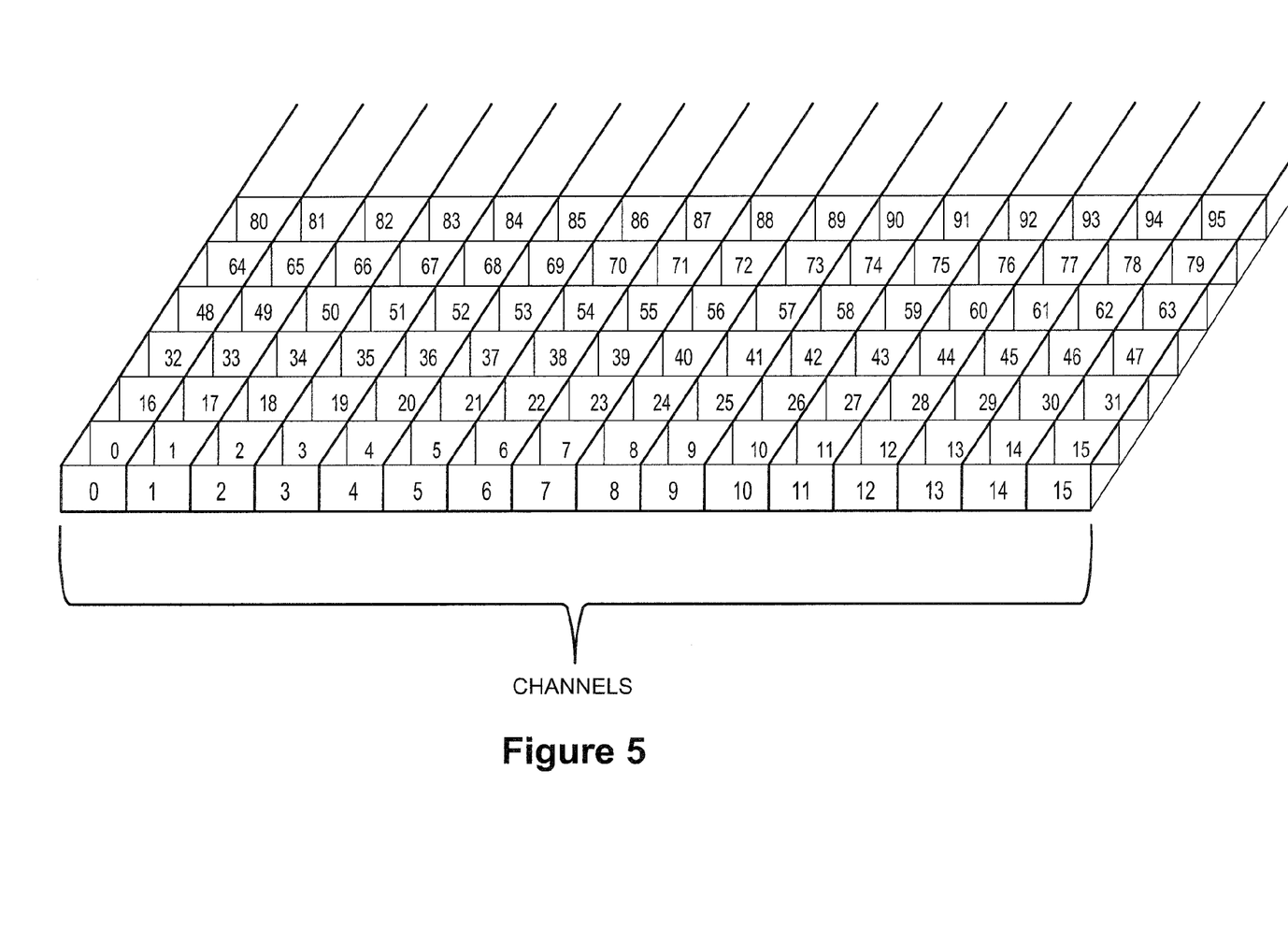
FIG. 5 illustrates one embodiment of channels and memory locations associated with channels.

FIG. 5 illustrates sixteen channels (0-15) and memory locations associated with channels (0-15). For example, channel 2 is associated with memory locations 2, 18, 34, 50, 66, and 82.

Figure 6:
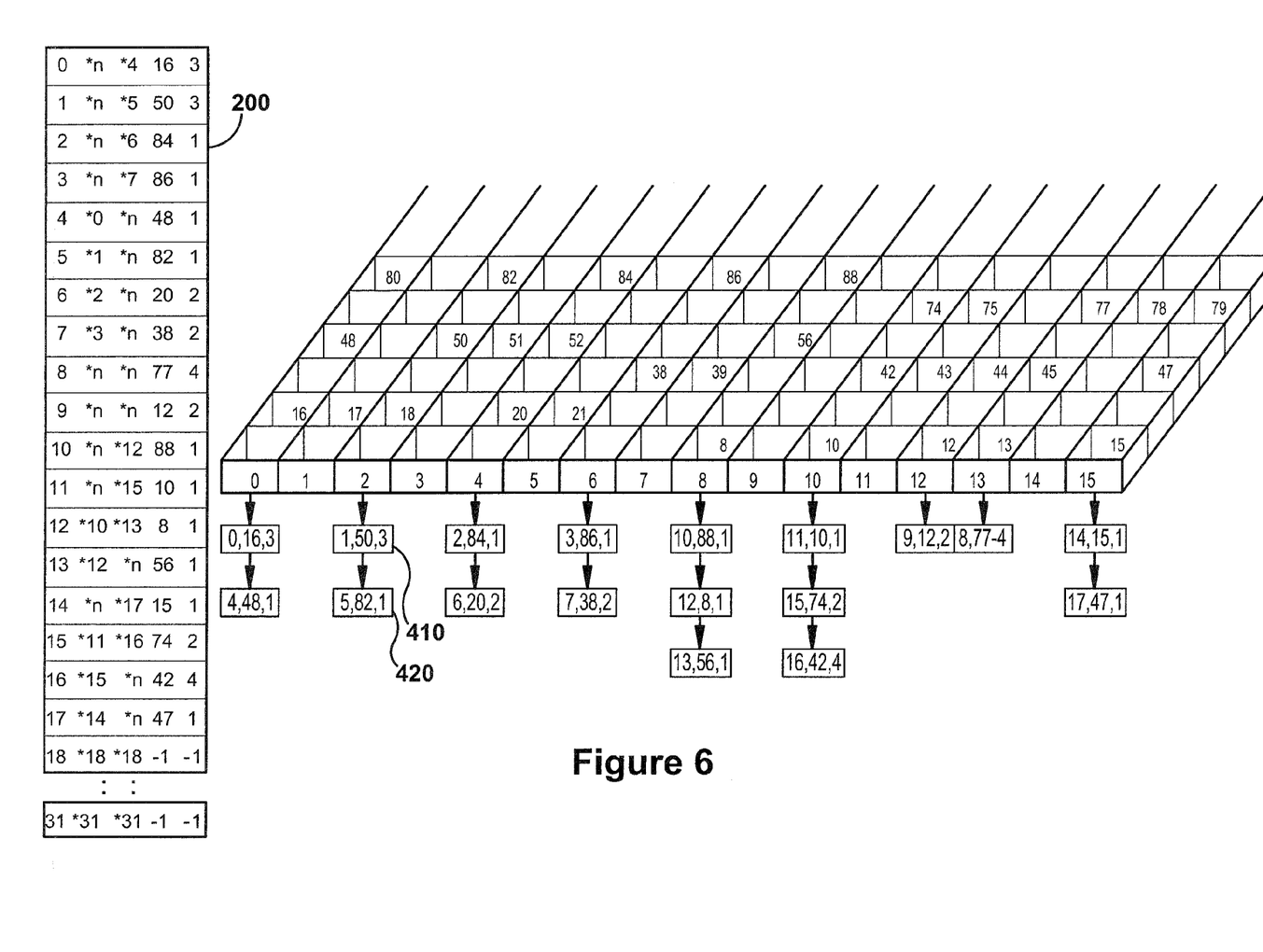
FIG. 6 illustrates one embodiment of a queue and how commands in the queue associate with channels.

FIG. 6 illustrates queue 200 and how commands in queue 200 associate with channels (0-15). For example, channel 2 is associated with command 410 whose tag value is 1 and command 420 whose tag value is 5. Command 1 has an LBA value of 50 while command 5 has an LBA value of 82. Commands 1 and 5 associate with channel 2 since channel 2 is used to access memory locations 50 and 82. The channels are used for commands to access certain memory locations.

Figure 7:
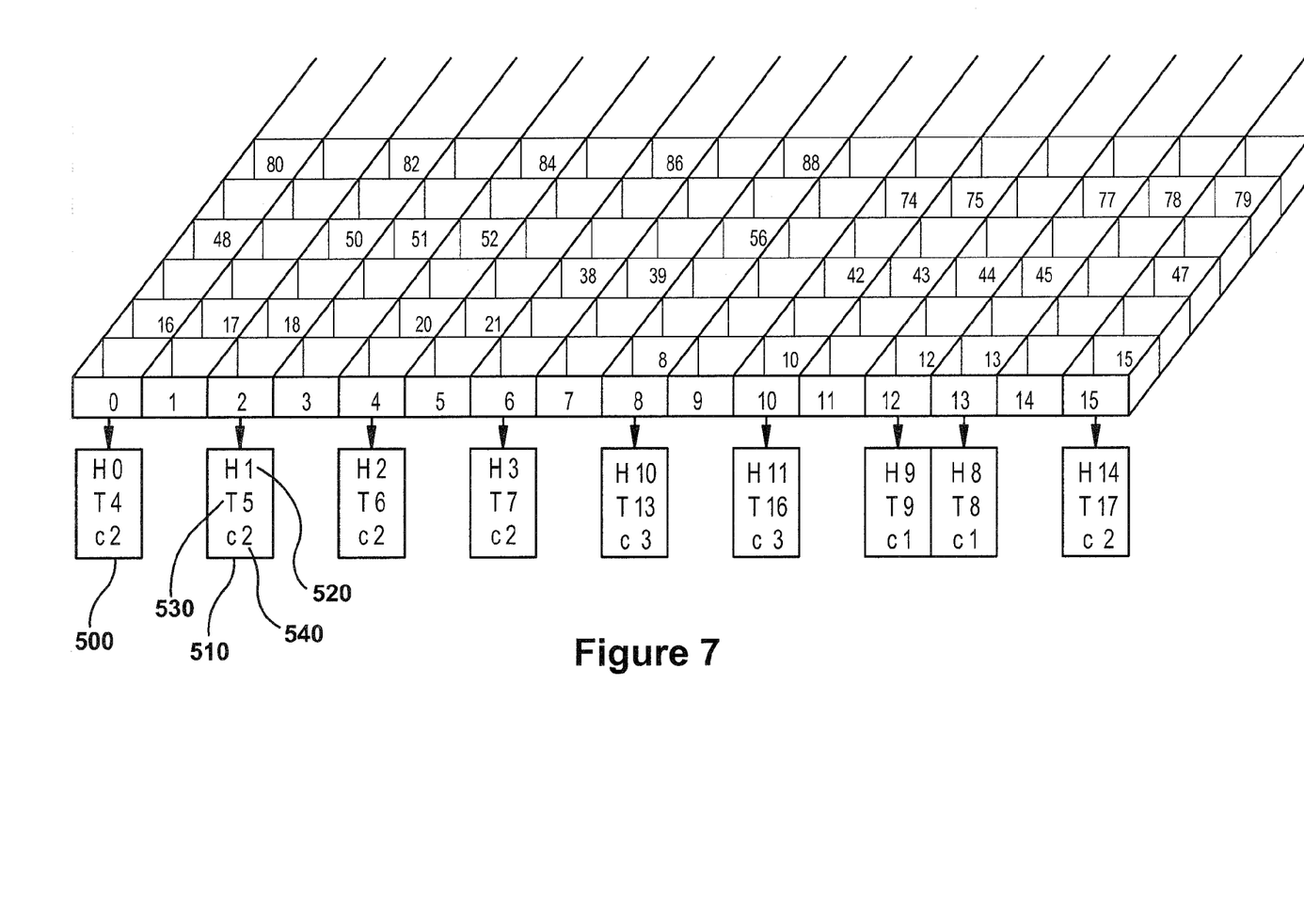
FIG. 7 illustrates one embodiment of channels and taglines associated with those channels.

FIG. 7 illustrates sixteen channels (0-15) and taglines associated with channels (0-15). FIG. 7 includes taglines 500 and 510. The tagline 510 includes a head 520, a tail 530, and a count 540. The head 520 indicates a first command associated with channel 2. The tail 530 indicates a last command associated with channel 2. The count 540 indicates command number for a tagline's channel. The tagline 510 is based on command 410 and command 420 (FIG. 6). Command 410 has a tag value of 1. Command 410 is the first command for channel 2. Head 520 is 1 since the first command on channel 2 has a tag value of 1. Command 420 has a tag value of 5. Command 420 is the last command for channel 2. Tail 530 is 5 since the last command on channel 2 has a tag value of 5. Since channel 2 has two commands, the count 540 for tagline 510 is 2. Example pseudo-code used to structure the tagline 510 includes:

```
typedef struct {
    mtUQ_CMD_ENTRY * pHead;
    mtUQ_CMD_ENTRY * pTail;
    mUINT_16         count;
} mtNvCmdTag;
```

Example pseudo-code used to structure an array of taglines includes:

```
typedef struct {
    mtNvCmdTag   nvCmdTagLines[16];
    mUINT_32     totalBlock;
    mUINT_16     numEntries;
    mUINT_16     nextTag;
} mtNvCmdReqPool;
```

One of ordinary skill in the art will appreciate from this disclosure and from the teachings herein that other code may be used to structure an array of taglines or an individual tagline.

Figure 8:
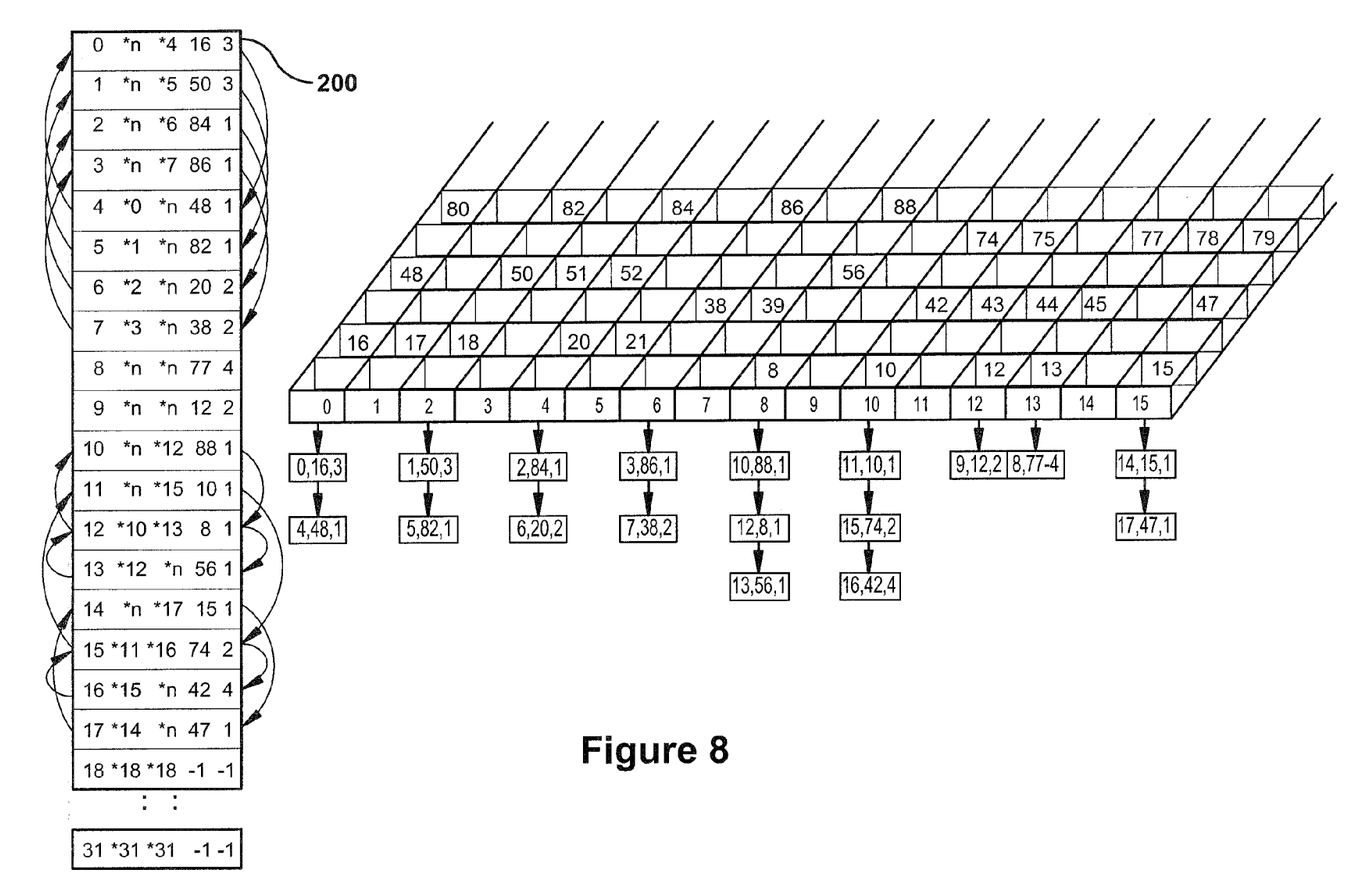
FIG. 8 illustrates one embodiment of how commands in a queue link together.

FIG. 8 illustrates how commands in the queue 200 link together. Channel 2 is associated with commands 1 and 5. The queue 200 has curved arrows. The curved arrows link together commands 1 and 5. The curved arrows represent relationships between commands in the queue 200. Queue 200 helps explain the pointers in the commands. For command 1 the last pointer is *n and the next pointer is *5. Since command 1 is the first command listed for channel 2, there is no last pointer and a blank field *n is shown. Since command 5 follows command 1, the next pointer is *5. "*5" indicates that command 5 follows command 1. Command 5 includes a *1 last pointer and *n next pointer because command 5 follows command 1 and no command follows command 5 in channel 2.

Intelligent packing allows more than one command to be executed at once. Command packing occurs in passes. The following is an example command-packing pass in FIG. 8. Command 0 is associated with channel 0. Command 0 is 3 blocks long. Since command 0 is three blocks long, channels 0, 1, and 2 are occupied. Channel 3 follows channel 2. Channel 3 is examined and no command uses channel 3. Thus, channel 3 is skipped. Channel 4 follows channel 3. Channel 4 is associated with command 2. Command 2 is 1 block long. Since channel 4 is not already being used, commands 0 and 2 are associated together to form a command pack. Following the above pattern, commands 3, 10, 11, and 9 are added to the command pack. Command 9 is 2 blocks long. Command 9 occupies channel 13 so channel 13 cannot be used for command 8 in this command pack. Command 14 is also added to the command pack. Ten channels are used in this command pack. Using ten channels is more efficient than using only three channels in conventional operation where command 0 might be sent alone. Command packing facilitates using multiple channels concurrently with different commands.

Figure 9:
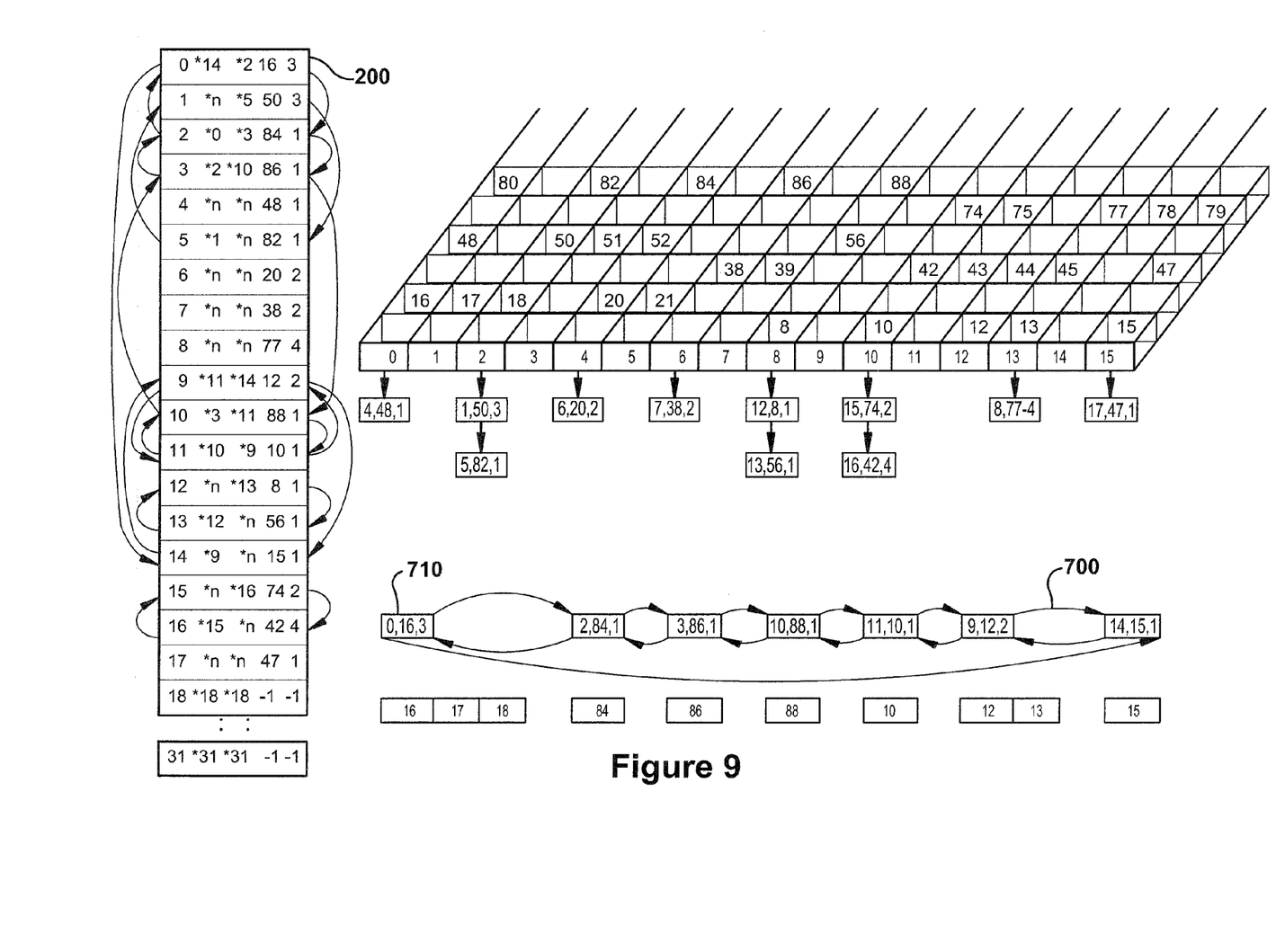
FIG. 9 illustrates one embodiment of how commands in a queue are re-linked together based on command packing.

FIG. 9 illustrates how the commands in the queue 200 are re-linked together based on the packing. While command 2 linked with command 6 in queue 200 as shown with FIG. 8, command 2 links with command 0 and command 3 in queue 200 as shown with FIG. 9. Links change so relationships are based on command packs and not channels. FIG. 9 further shows relationships 700 between commands in the command pack 710. In one embodiment, command packing continues until all commands are executed. In one example, three command packs are formed and executed to communicate the 18 commands held in the queue 200. Command packing provides for a quicker response than if 18 command execution instances occur. Thus, command packing as performed by method 1000 and/or apparatus 1200 improves performance.

Figure 10:
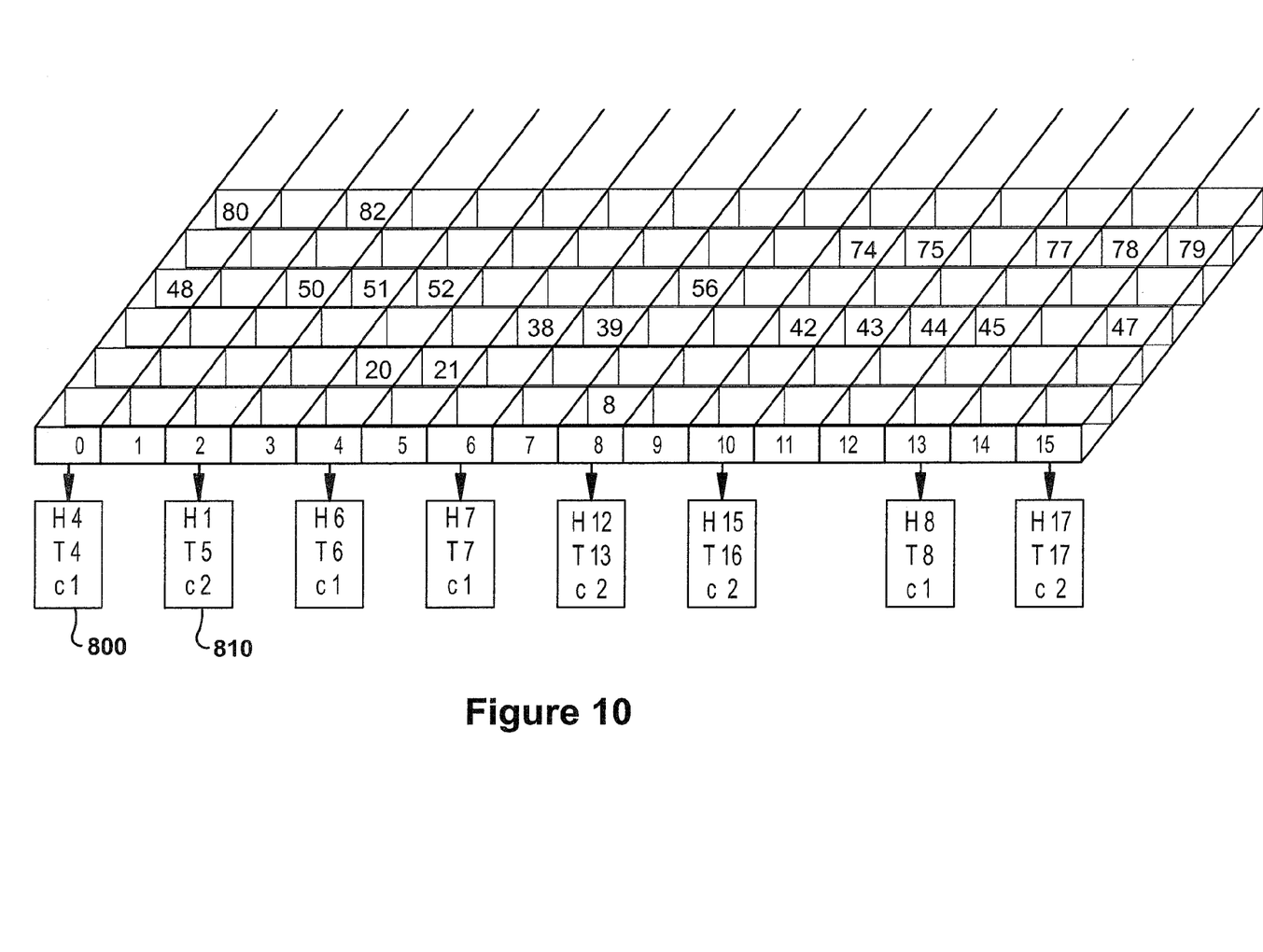
FIG. 10 illustrates one embodiment of taglines after executing a command pack.

FIG. 10 illustrates taglines after executing the command pack described in FIG. 8. Tagline 800 is different than tagline 500 in FIG. 7. Since a command has been executed on channel 1, one command remains—command 4. The head and tail for tagline 800 are both 4 since the first command and last command are both command 4. Since there is one command for channel 0, the count for tagline 800 is now 1. A command from channel 2 was not executed in the command-packing pass described in FIG. 8. Due to no command being executed from channel 2, tagline 810 is unchanged from tagline 510 in FIG. 7.

Figure 11:
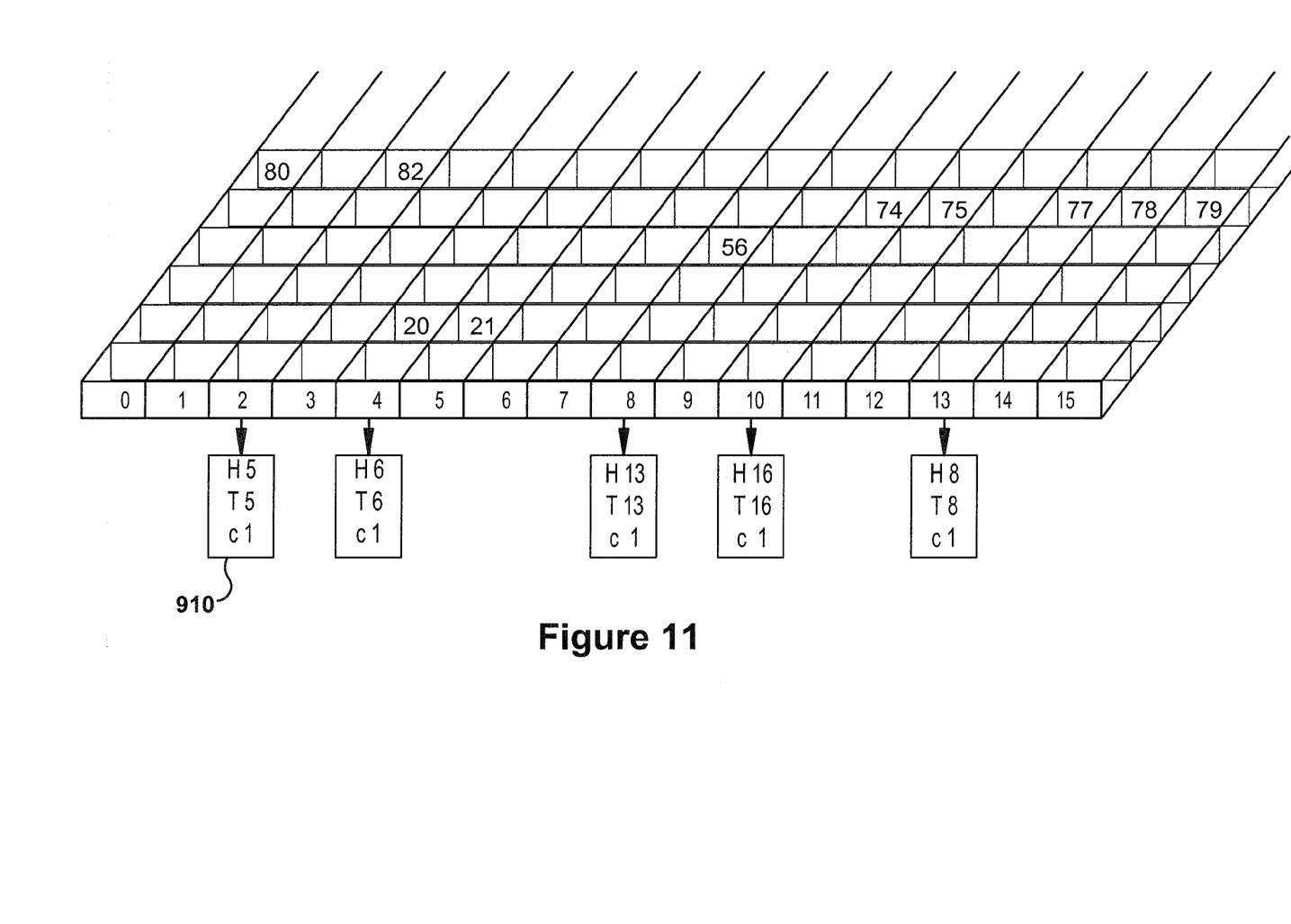
FIG. 11 illustrates one embodiment of taglines after a second command-packing pass occurs and a second command pack is executed.

FIG. 11 illustrates taglines after a second command-packing pass occurs and a second command pack is executed. Channel 0 no longer has a tagline since all commands on channel 2 have been executed. A tagline 910 on channel 2 has changed under similar circumstance as those for tagline 810 in FIG. 10. After another command packing and command pack execution, no more commands remain. Thus, 18 commands are executed by executing three command packs.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method, comprising:
   determining an execution priority for each of a plurality of commands;

grouping at least two commands from the plurality of commands into a command pack based, at least in part, on one or more attributes of the at least two commands, wherein grouping the at least two commands includes grouping the at least two commands based, at least in part, on the execution priority for each of the at least two commands; and
controlling a solid-state drive to execute the command pack by causing the at least two commands to execute concurrently on separate channels of the solid-state drive.

2. The method of claim 1, wherein grouping the at least two commands into the command pack includes generating a plurality of command packs that collectively include the plurality of commands, wherein the plurality of commands are waiting for execution on the solid-state drive, wherein the one or more attributes include a channel of execution for each of the at least two commands, wherein grouping the at least two commands includes defining the command pack using a set of tags associated with each of the at least two commands, and wherein grouping the at least two commands includes adapting the at least two commands to create a relationship between the at least two commands that causes the at least two commands to be executed in parallel.

3. The method of claim 1, wherein a command from the plurality of commands is not grouped into the command pack when the command is a high priority command.

4. The method of claim 1, further comprising:
collecting the plurality of commands in a queue until an occurrence of a predefined queue-related event, wherein the queue is a separate storage location from a host device that is configured to store commands waiting to be executed on the solid-state drive.

5. The method of claim 4, wherein the predefined queue-related event includes the queue satisfying a threshold level of commands waiting in the queue or a command being resident in the queue for a predetermined threshold amount of time.

6. The method of claim 1, comprising:
selectively grouping the at least two commands into the command pack upon determining that each of the at least two commands do not exceed a command size threshold, wherein grouping the at least two commands into the command pack creates a relationship between the at least two commands that causes the commands to be executed in parallel.

7. An apparatus, comprising:
a hardware memory configured to store a plurality of commands that are to be executed on a solid-state drive; and
organization logic implemented with at least hardware and configured to arrange at least two commands of the plurality of commands into a command pack based, at least in part, on one or more attributes of the at least two commands,
wherein the organization logic is configured to determine execution priorities for the plurality of commands, wherein the organization logic is configured to arrange the at least two commands into the command pack based, at least in part, on the execution priorities for each of the at least two commands.

8. The apparatus of claim 7, wherein the one or more attributes include a channel for execution, a priority, or a command size and wherein the organization logic is configured to arrange the at least two commands into the command pack to create a relationship between the at least two commands that links the at least two commands together, and wherein the organization logic is configured to arrange the at least two commands by adapting the at least two commands to create a relationship between the at least two commands that causes the at least two commands to be executed in parallel.

9. The apparatus of claim 7, further comprising:
function logic configured to control the solid-state drive to execute the command pack, wherein commands in the command pack are executed simultaneously in parallel, and wherein executing a command on the solid-state drive consumes a channel of a plurality of channels for execution.

10. The apparatus of claim 7, wherein the organization logic is configured to not group a command of the plurality of commands into the command pack upon determining that the command is a high priority command, and to cause the command to be executed independent of the command pack when the commands is a high priority command.

11. The apparatus of claim 7, wherein the hardware memory includes a queue and wherein the organization logic is configured to collect the plurality of commands in the queue until an occurrence of a queue-related event.

12. The apparatus of claim 7, wherein the organization logic is configured to create a relationship that indicates that the at least two commands are part of the command pack, and wherein the organization logic is configured to selectively group a command of the plurality of commands into the command pack upon determining that a size of the command satisfies a threshold.

13. The apparatus of claim 7, wherein the organization logic is configured to arrange the at least two commands of the plurality of commands into the command pack upon determining that the at least two commands do not share a channel for execution on the solid-state drive.

14. An apparatus, comprising:
management logic implemented in at least hardware and configured to collect a plurality of commands into a queue, wherein the plurality of commands are data access commands for a solid-state drive; and
organization logic implemented in at least hardware and configured to link at least two commands from the plurality of commands together into a command pack based, at least in part, on one or more attributes of the at least two commands,
wherein the organization logic is configured to determine execution priorities for the plurality of commands, wherein the organization logic is configured to link the at least two commands into the command pack based, at least in part, on the execution priorities for each of the at least two commands.

15. The apparatus of claim 14, wherein the organization logic is configured to link the at least two commands by adapting the at least two commands to create a relationship between the at least two commands that causes the at least two commands to be executed in parallel, and wherein the organization logic is configured to link the at least two commands from the plurality of commands into the command pack by defining a relationship between the at least two commands to cause the at least two commands to be executed concurrently on separate channels of the solid-state drive.

16. The apparatus of claim 14, wherein the one or more attributes include a channel for execution assigned to each of the plurality of commands, an execution priority for each of the plurality of commands or a size of each of the plurality of commands.

17. The apparatus of claim 14, wherein the organization logic is configured to link the at least two commands into the command pack based, at least in part, on a priority of the at least two commands when the at least two commands are not high priority commands.

18. The apparatus of claim 14, wherein the management logic is configured to collect the plurality of commands until an occurrence of a queue related event that causes the organization logic to link commands from the plurality of commands into one or more command packs.

19. The apparatus of claim 14, further comprising:
function logic implemented in at least hardware and configured to cause the command pack to execute on a solid-state drive by executing the at least two commands in parallel on different execution channels of the solid-state drive.

* * * * *